US006920373B2

(12) United States Patent
Xi et al.

(10) Patent No.: US 6,920,373 B2
(45) Date of Patent: Jul. 19, 2005

(54) SYNCHRONIZATION AND TASK CONTROL OF REAL-TIME INTERNET BASED SUPER-MEDIA

(75) Inventors: Ning Xi, Okemos, MI (US); Imad Elhajj, East Lansing, MI (US)

(73) Assignee: Board of Trusstees Operating Michigan State University, East Lansing, MA (US)

( * ) Notice: Subject to any disclaimer, the term of this patent is extended or adjusted under 35 U.S.C. 154(b) by 292 days.

(21) Appl. No.: 10/123,044

(22) Filed: Apr. 15, 2002

(65) Prior Publication Data

US 2002/0184674 A1 Dec. 5, 2002

Related U.S. Application Data

(60) Provisional application No. 60/283,695, filed on Apr. 13, 2001.

(51) Int. Cl.[7] .............................................. G06F 19/00
(52) U.S. Cl. ..................... 700/245; 700/257; 700/258; 700/259; 709/100; 709/203; 709/208; 709/217; 709/300; 710/5; 318/611; 606/130
(58) Field of Search ............................... 700/245, 257, 700/258, 259; 709/100, 203, 208, 217, 330; 710/5; 318/611; 606/130

(56) References Cited

U.S. PATENT DOCUMENTS

| | | | |
|---|---|---|---|
| 5,640,159 A | * | 6/1997 | Furlan et al. .................. 341/51 |
| 6,161,126 A | | 12/2000 | Wies et al. |
| 6,184,868 B1 | | 2/2001 | Shahoian et al. |
| 6,266,322 B1 | * | 7/2001 | Berger et al. ................ 370/229 |
| 6,274,995 B1 | * | 8/2001 | Kerner ......................... 318/611 |
| 2001/0047213 A1 | * | 11/2001 | Sepe ............................. 700/65 |
| 2001/0052035 A1 | * | 12/2001 | Singer et al. ................... 710/5 |
| 2002/0144021 A1 | * | 10/2002 | Pigos et al. .................. 709/330 |

FOREIGN PATENT DOCUMENTS

| WO | WO 95/20787 | 8/1995 |
|---|---|---|
| WO | WO 95/20788 | 8/1995 |

OTHER PUBLICATIONS

Mack, Minimally invasive and robotic surgery, 2001, Internet, pp. 568–572.*
Tsumaki et al., Verification of an advanced space teleoperation system using Internet, 2000, IEEE, pp. 1167–1172.*
Elhajj et al., Synchronization and control of supemedia transmission via the Internet, 2001, Internet, pp. 320–323.*
Elhajj et al. Supermedia in Internet–based teleoperation operations, 2001, Internet, pp. 359–372.*

(Continued)

*Primary Examiner*—Thomas G. Black
*Assistant Examiner*—McDieunel Marc
(74) *Attorney, Agent, or Firm*—Harness, Dickey & Pierce, P.L.C.

(57) ABSTRACT

A closed-loop control system that remotely controls a device over a distributed communications system includes a device that is connected to the distributed communications system and that generates super-media feedback signals. A computer is connected to the distributed communications system and includes a controller that provides super-media feedback. The computer generates and transmits command signals using the controller to the device and outputs the super-media feedback signals to the controller. The closed-loop control system is event-based to ensure stability and synchronization of the closed-loop system.

35 Claims, 7 Drawing Sheets

OTHER PUBLICATIONS

Chiu, Image guidance for cardiac surgery, 1999, Internet, pp. 1–3.*

Spice, UPMC puts 'robodoc' to work in surgery, 2000, Internet, pp. 1–4.*

Bate et al., The feasibility of force control over the Internet, 2001, Internet, pp. 146–151.*

Imad Elhajj, Ning Xi, Wai Keung Fung, Yun hui Liu, Tomoyuki Kaga, Toshio Fukuda, "Hepatic Information in Internet–Based Teleoperation", IEEE/ASMI Transactions on Mechatronics, 2001.

Smith, Christopher M., "Human Factors in Hepatic Interface", Human Computer Interaction Spring 1997–3.3.

Lai/Fung/Li/Elhajj/Xi, "Internet–Based Remote Sensing and Manipulation in Micro Environment", Aug. 2000.

Campbell/Zhai/May/Maglio, "What You Feel Must Be What You See: Adding Tactile Feedback to the Trackpoint", Proceedings of INTERACT '99, IOS Press, pp. 383–390.

Elhajj/Xi/Liu, "Real–Time Control of Internet Based Teleoperation with Force Reflection", Proceeding of the 2000 IEEE Interational Conference on Robotics & Automation, Apr. 2000.

Brehm/Salisbury, "Device turns computer into tactile tool, lets user touch virtual objects", MIT News, Mar. 11, 1998, pp. 1–3.

* cited by examiner

SYNCHRONIZATION AND TASK CONTROL OF REAL-TIME INTERNET BASED SUPER-MEDIA

FIELD OF THE INVENTION

The present invention relates to the control of devices, and more particularly to super-media enhanced control of devices over the Internet.

BACKGROUND OF THE INVENTION

Over the last few years, the Internet has been transformed from a simple data transmission medium to a virtual world. Goods can be bought and sold in a variety of ways through retail sites, auction sites, bulletin boards, etc. Many people use the Internet to learn, research, and explore. More recently, devices such as robots have been controlled remotely over the Internet.

The Internet is a packet-switched network. When a user sends information over the Internet to another computer, the data is broken into small packets. The Internet does not guarantee a specific delivery time or a particular delivery route for the packets. Therefore, the delays caused by communication links over the Internet are random with no simple statistical model.

Routers direct the packets across the Internet individually. When the packets arrive at the destination computer, the packets are recombined into their original form. Two different protocols handle the work of breaking the data into packets, routing the packets across the Internet and recombining the packets on the other end. Internet protocol (IP) routes the data and transmission control protocol (TCP) breaks the data into packets and recombines the packets at the destination computer.

Each packet of data is assigned a header that contains information such as the order of reassembling the packets. As TCP creates each packet, it also calculates and adds a checksum to the packet. The checksum is a number that TCP uses to determine whether an error occurred during transmission. The checksum is based on the precise amount of data in the packet. Each packet is enclosed in a separate IP envelope that contains address information for instructing the routers.

As the packets are sent across the Internet, the routers examine the IP envelopes and look at their addresses. The routers determine the most efficient path for sending each packet. After traveling through a series of routers, the packets arrive at the destination computer. Because the traffic load on the Internet varies constantly, the individual packets may be sent along different routes and may arrive at the destination computer out of order.

As the packets arrive at the destination computer, TCP calculates the checksum for each packet. If the calculated checksum compares favorably with the checksum contained in the packet, the TCP packet does not contain errors. If the checksum does not match, TCP knows that the data in a packet has been corrupted during transmission. TCP discards the packet, contacts the sender, and requests that the corrupted packet be retransmitted. When the destination computer receives all of the non-corrupt packets, TCP assembles the packets into their original form.

Real-time control systems over the Internet must account for the delays, packet loss and other transmission problems. The transmission problems are particularly important in closed-loop super-media systems. Super-media systems include feedback of audio, video, text, and sensory information such as temperature and/or haptic. These systems must also contend with lost packets and random disconnection. Each of these transmission problems may cause instability in the control system, especially for closed-loop systems.

There are several conventional systems that employ robots that are controlled remotely through the Internet. In one system, a semi-autonomous telerobot responds to trajectory commands that are provided by a remotely located operator through the Internet. The operator intervenes only when unexpected circumstances arise. This system and others like it typically provide visual information but no other form of sensory feedback.

A common form of sensory feedback is force feedback that may correspond to many different environmental parameters. Force/torque sensors are one of the most common ways of generating force feedback. One example of force feedback is provided by computer games that use the Microsoft Sidewinder® Force Feedback Pro joystick. Force feedback can correspond to actual or virtual forces. For example, force feedback corresponding to an actual force may allow the operator to a feel a force that corresponds to a physical force that is exerted on the controlled device or robot. Force feedback corresponding to a virtual force may represent the distance between the controlled device and an object. Force feedback couples the operator with the environment by allowing the operator to feel the environment and the status of the controlled device. In other words, force feedback provides important haptic information that can significantly improve the efficiency of teleoperation.

There have been many attempts to control devices over the Internet with force feedback. Each of the conventional approaches has made one of the following assumptions: the transmission delay is fixed and not random; the transmission delay is the same in both directions; or, the transmission delay has an upper bound or limit. None of these assumptions are true when dealing with real-time closed-loop control systems over the Internet that employ force feedback or other super-media feedback.

SUMMARY OF THE INVENTION

A closed-loop control system according to the invention that remotely controls a device over a distributed communications system includes a device that is connected to the distributed communications system and that generates super-media feedback signals. A computer is connected to the distributed communications system and includes a controller that provides super-media feedback. The computer generates and transmits command signals using the controller to the device and outputs the super-media feedback signals to the controller. The closed-loop control system is event-based to ensure stability and synchronization of the closed-loop system.

In other features of the invention, the computer includes a command module that generates the command signals based on user input to the controller. The device includes a video sensor that generates video frames and the computer includes a video playback module that controls playback of the video frames that are generated by the device. The device includes an audio sensor that generates audio frames and the computer includes an audio playback module that controls playback of the audio frames generated by the audio sensor of the device.

In other features of the invention, the device includes a processing unit with a motion module that controls movement of the device. The processing unit includes a video module that controls a video sensor. The processing unit includes an audio module that controls an audio sensor.

In yet other features, the device includes a proximity sensor that generates a distance signal based on a distance between the device and an obstacle. The motion module receives the distance signal, generates a modified command signal using an obstacle avoidance algorithm, and generates the super-media feedback signal based on an actual velocity of the device.

In still other features, the command module translates the input from the controller to a velocity command signal and transmits the velocity command signal to the device. The controller includes a first button that enables the controller to send the velocity command signals based on a position of the controller. The controller includes a second button that enables the controller to send video control commands based on the input to the controller for controlling a video sensor that is associated with the device.

In other features of the invention, when a haptic feedback signal is received by the computer, a super-media playback module plays the feedback signal if the super-media feedback signal is close in event to a reference super-media feedback event.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Control systems that employ time as a reference variable cause instability and desynchronization in traditional control systems due to delays in communication links. The control system according to the present invention employs events as a reference. As a result, the control system according to the present invention is stable and synchronized.

Figure 1:
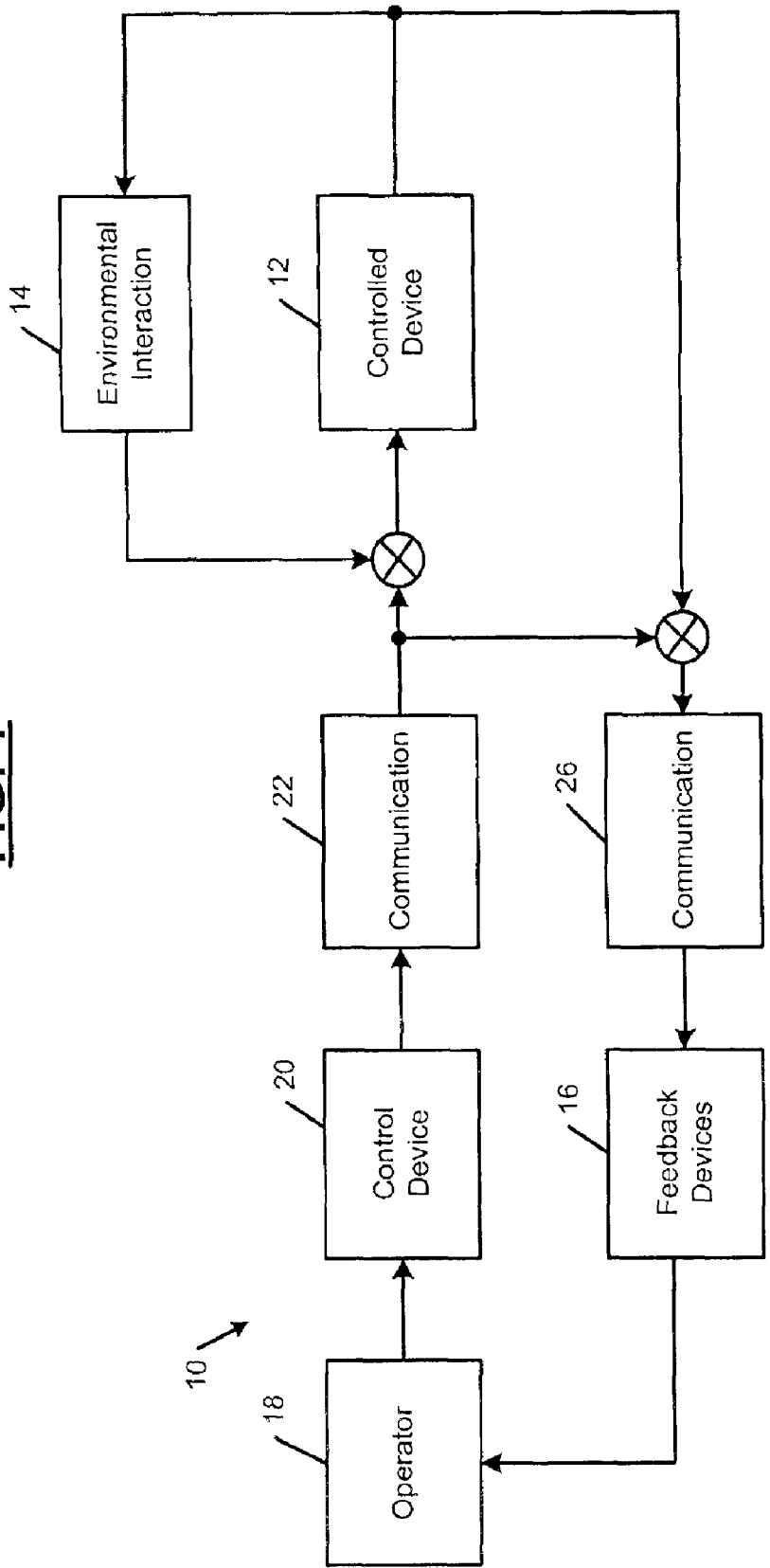
FIG. 1 is a model illustrating a real-time, closed-loop control system over the Internet.

Referring now to FIG. 1, a control system 10 according to the present invention is illustrated. The control system 10 includes a controlled device 12 such as a robot. Interaction between the controlled device 12 (that will be represented by super-media feedback) and the surrounding environment is depicted at 14. A feedback device 16 provides super-media feedback to an operator 18. For example, the super-media feedback can include force feedback, audio signals, images, and/or temperature. Skilled artisans will appreciate that other types of super-media feedback signals may be employed without departing from the present invention.

Based on the feedback, the operator 18 manipulates a control device 20 that sends signals through a communication link 22 to the controlled device 12. Similarly, the feedback device 16 receives the super-media feedback through a communication link 26. In a preferred embodiment, the control device 20 and the feedback device 16 are a single device such as a joystick. For example, the joystick can include temperature feedback. The temperature feedback can be implemented using a heater, a heat sink and a fan that cool or heat a contact surface that is in contact with the finger(s) of an operator.

The operator 18 was modeled using a spring-like behavior. The operator 18 often compensates for certain machine instabilities and stabilizes the coupled human-machine system. Once the operator 18 feels a force, the operator 18 generates a new joystick position according to the following:

$$X_m(s) = \frac{F_h(s-1)}{K_h}$$

where $K_h$ is a constant, s is the event and $S \in \{1, 2, \ldots\}$. $X_m$ and $F_h$ are:

$$X_{mx}(s) = \begin{bmatrix} X_{mx}(s) \\ X_{my}(s) \\ x_{mO}(s) \end{bmatrix} \quad F_h(s) = \begin{bmatrix} F_{hx}(s) \\ F_{hy}(s) \\ F_{hO}(s) \end{bmatrix}$$

$F_h(S)$ is the applied force that is felt by the operator 18. Thus, the x and y components are due to the force that is fed back and to the additional force that is required to move the joystick to the new location. Since force is not fed back in the O direction, this component is a result of getting the joystick to the next location. As seen in the first equation, $X_m(s)$ is related to $F_h(s-1)$, so $X_m(s)$ at event s is generated by the previous force at event s−1. This results in an event-based reference where each event is triggered by the previous event.

The dynamics of the joystick are:

$$M_m V_{mm}(s+1) = F_h(s) + T_m(s)$$

where $M_m$ is the mass of the joystick handle, $V_{mm}$ is velocity of joystick movement, and $F_h$ is as described before. $T_m$ is the feedback from the controlled device or robot, which would be the force played by the joystick. The result from these dynamics is the joystick getting to a new position $X_m(s+1)$. From this position the desired velocity $V_m$ is derived according to:

$$V_m(s) = K_m X_m(s)$$

where $K_m$ is a scaling constant, $X_m(s)$ is as before and $V_m(s)$ is the desired velocity of the robot. The different vectors are:

$$V_m(s) = \begin{bmatrix} V_{mx}(s) \\ V_{my}(s) \\ V_{mO}(s) \end{bmatrix} \quad T_m(s) = \begin{bmatrix} T_{mx}(s) \\ T_{my}(s) \\ 0 \end{bmatrix}$$

$T_{mO}(s)=0$, since force is not fed back in the rotational direction.

As a result of the event-based reference, the communication link is a delay element that plays no role in the modeling of the system. It is assumed that the Internet is supplying the communications link. When the connection is lost, the system stops waiting for the connection. The advance of time does not affect the system. Only the occurrence of the event s will affect the system. When the connection is lost, the system remains stable and resumes action after the connection is re-established. Therefore, the event-based reference makes the system very robust since no initialization or synchronization is required.

Contact is not required to generate force feedback signals. Different sensors positioned on or around the robot are used to detect objects without requiring contact. Based on the distance between the object and the robot, a virtual force is generated. This is done according to a function of distance f(d) that gives a velocity value $V_{in}(s)$ that is subtracted from the desired velocity $V_m(s)$.

$$V_s(s) = V_m(s) - V_{in}(s)$$

$V_s(s)$ is the velocity sent the robot, $V_{in}(s)$ is the effect of the environment and $V_m(s)$ is as before.

$$V_s(s) = \begin{bmatrix} V_{sx}(s) \\ V_{sy}(s) \\ V_{mO}(s) \end{bmatrix} \quad V_{in}(s) = \begin{bmatrix} V_{inx}(s) \\ V_{iny}(s) \\ 0 \end{bmatrix}$$

The desired velocity that the robot receives is less than the actual velocity. The reduced velocity is used to generate the virtual force feedback. No force is generated in the rotational direction therefore $V_{inO}(s)=0$ and $V_{sO}(s)=V_{mO}(s)$, as can be seen below.

Once the robot receives $V_s(s)$, the robot moves with that velocity but would actually have $V_a(s)$ as its velocity. The robot calculates the velocity tracking error with respect to the original desired velocity $V_m(s)$ and sends that velocity to the feedback device 16. $T_m(s)$ and the dynamics of the robot are:

$$T_m(s) = K_r(V_m(s) - V_a(s))$$

$$M_s V_a(s) = F_e(s) + T_s(s)$$

$$T_s(s) = -\daleth V_a(s) + K V_{err}(s) - a_f F_e(s)$$

$$V_{err}(s) = V_s(s) - V_a(s)$$

$$V_a(s) = \begin{bmatrix} V_{ax}(s) \\ V_{ay}(s) \\ V_{mO}(s) \end{bmatrix}$$

where $K_r$, $\daleth$, K and a are constants, $M_s$ is mass of robot, $F_e$ is the actual environment forces (if any). $T_s$ and $V_{err}$ are robot internal controller terms. The operator feels the velocity tracking error, which can be the result of the robot getting close to an object. From the direction and magnitude of the force, the operator feels the location and the distance of the obstacle to the robot. The operator also feels force whenever the robot comes in contact with an object. When actual contact occurs, $V_a(s)$ decreases $T_m(s)$ proportionally increases. Moreover, $V_{aO}(s)=V_{mO}(s)$ since $T_{mO}=0$.

When using event-based control, the following theorem is true: If the original robot dynamic system (without the remote human/autonomous controller) is asymptotically stable with t as its action reference, s=Π(y) is a (monotone increasing) nondecreasing function of time t, then the system is (asymptotically) stable with respect to the new action reference s.

The only assumption needed is that the robot is a stable system, which means that the original robot dynamic system (without the remote operator) is asymptotically stable with t as its action reference. This would allow the use of the theorem and proves the stability of the system with respect to the new action reference s by proving that the new non-time action reference is (monotone increasing) nondecreasing function of time t. The advantage of this approach is that stability is established independent of the human model and the statistics of time-delay.

The major difficulty in selecting s involves the uncertainties in the system. The main uncertainties are the trajectory and the environment. Usually the event s is taken to be a function of the physical output, for example, the distance from an absolute position. But, in teleoperation, typically none of these parameters are defined.

The operator places the joystick in a first position that corresponds to a velocity vector. The vector is sent to the sensing unit on the robot. The sensing unit scans the environment. Based on the position of obstacles in the environment, the velocity is reduced and sent to the robot motors to be executed. The motors execute the command. Then, the actual velocity is calculated. The actual velocity is subtracted from the original velocity that was indicated by the operator. The difference is sent back to the joystick motor to be played as force feedback. None of these steps can be executed out of order. Each event is triggered by the end of the previous one. It is important to note that, although the operator could move the joystick, the commands will not be sampled by the joystick until feedback is received and played. Based on this control algorithm, a natural selection of the event variable s is a counter or similar device.

Figure 2A:
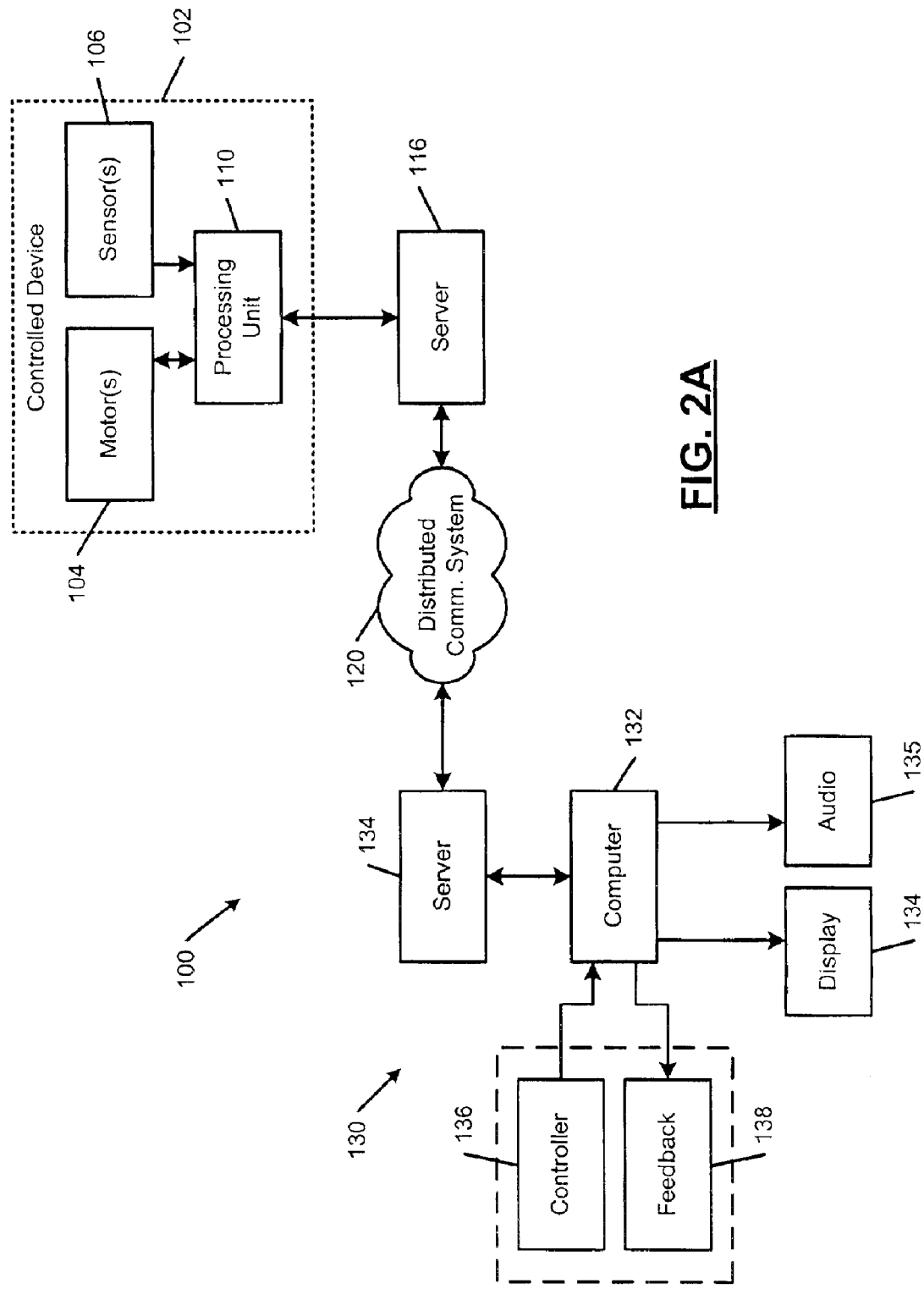
FIG. 2 is a block diagram of exemplary devices that are employed by the real-time, closed-loop control system over the Internet.
Figure 2C:
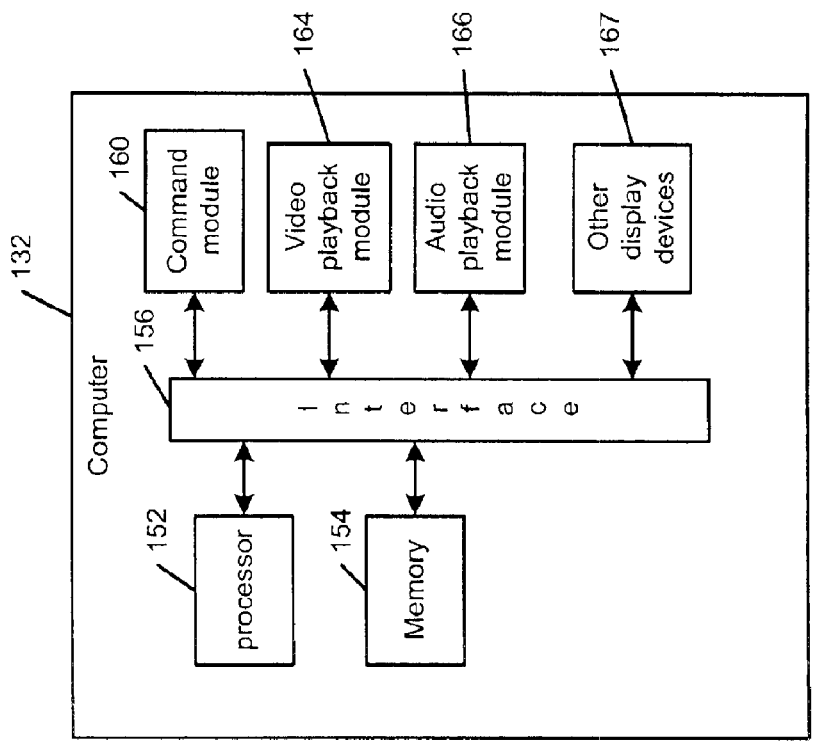
Figure 2B:
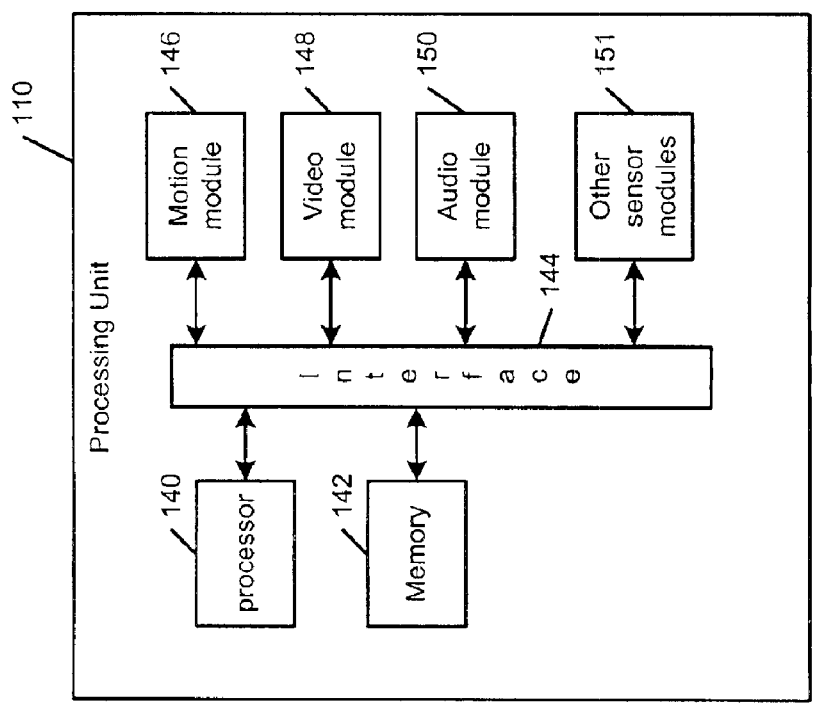

Referring now to FIGS. 2A, 2B and 2C, an exemplary real-time, closed-loop control system is shown at 100. The control system 100 includes a controlled device 102 with one or more motors 104 that move the controlled device 102 or some part thereof, or that initiate other action that is to be controlled. One or more sensors 106 generate super-media feedback signals. A processing unit 110 performs processing and other functions for the controlled device 102 as will be described further below. The processing unit 110 preferably includes a processor and memory such as read only memory (ROM), random access memory (RAM), and/or flash memory. The controlled device 102 may be in communication with a server 116 that is connected to a distributed communications system 120 such as the Internet. Skilled artisans will appreciate that the method of connecting the controlled device 102 may vary. For example, the controlled device 102 may be connected directly to the distributed communications system 120. Alternately, the controlled device 102 may be connected to a private network that is connected to the distributed communications system 120. Still other connection variations will be apparent to skilled artisans.

A remotely located control system 130 may include a server 134 that is part of a local area network (LAN) or a wide area network (WAN) that is connected to the distributed communications system 120. A computer 132 is connected to the server 134. Alternately, the computer 132 may be directly connected to the distributed communications system 120. The computer 132 includes a display 134, audio output 135 and other input/output (I/O) devices such as a keyboard, a mouse, etc. A control device 136 and a supermedia feedback device 138 are connected to the computer 132. In a preferred embodiment, the control device 136 and the feedback device 138 are integrated in a single device. For example, the controller 136 and the feedback device 138 can be a force feedback joystick. The display 134 and the audio output 135 play video and audio signals from the sensors 106. Still other types of devices that provide supermedia feedback signals are contemplated.

The processing unit 110 includes a processor 140, memory 142 and an input/output (I/O) interface 144. The processing unit 110 further includes a motion module 146 that operates the controlled device 102, a video module 148 that operates the video sensor, and/or an audio module 150 that operates the audio sensor. Skilled artisans will appreciate that other sensor modules 151 can be provided.

The computer 132 includes a processor 152, memory 154 and I/O interface 156. The computer 132 further includes a command module 160 that controls the control device 136 and the feedback device 138, a video playback module 164 that handles playback of the video packets, and an audio playback module 166 that handles playback of the audio packets. Skilled artisans will appreciate that other display devices 167 can be provided.

The motion module 146 controls movement of the controlled device 102 and receives feedback signals. The motion module 146 does not execute requests blindly. The motion module 146 first checks the sensors 106 for obstacles and makes a decision according to an obstacle avoidance and force generation algorithm contained in the motion module 146. After a velocity to be set is decided upon, it is sent to the motor 104 for execution. The motion module 146 takes the actual velocity of the controlled device 102, subtracts it from the original velocity, and sends it back to the client as force feedback. To overcome problems associated with disconnection, the motion module 146 executes the velocities for a predetermined period or distance such as 250 milliseconds or 1 cm. If no new commands are received, the motion module 146 stops moving the motor 104 and waits for a subsequent command.

The command module 160 sends commands to the motion module 146 and relays commands back to the feedback device 138 once feedback is received. Communications with the feedback device 138 are preferably achieved using DirectX® technology. Preferably, the client delays the sampling of a subsequent command so that the force feedback is played before the subsequent command is sampled. Preferably, command module waits a predetermined period such as 250 milliseconds before sampling the position of the joystick after the force feedback is played. That way, the operator is given time to feel the force feedback and to plan a subsequent command.

The obstacle avoidance and force generation algorithm in the motion module 146 preferably employs one or more sensors 106 on the controlled device 102 that detect the distance d to a closest object in a direction of motion. If the sensors 106 detect an object closer than a predefined critical distance $d_c$, the motion is stopped. Otherwise, the closest distance d is used to calculate the velocity. A velocity is set to $V_s$ where $V_{in}=f(d)V_m$. Therefore, the velocity that is set is a fraction of the desired velocity when based on a predefined distance function f(d). In a preferred embodiment, the controlled device 102 slows down linearly when an object is detected between 0.5 meter (m) and 1.0 m. Then, the force feedback is generated by measuring the actual velocity of the controlled device 102. The difference between the actual velocity and the desired velocity is calculated and sent to the feedback device 138.

Figure 3:
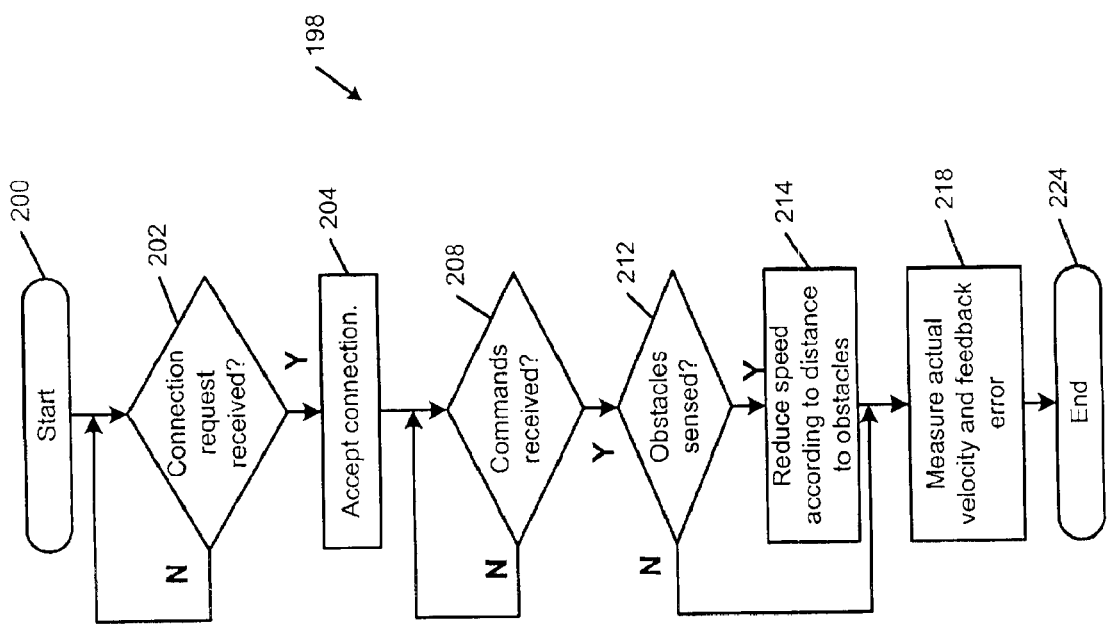
FIG. 3 illustrates steps for controlling a motion server using event-based control.

Referring now to FIG. 3, steps executed by the motion module 146 are illustrated at 198. Control begins with step 200. In step 202, the motion module 146 determines whether a connection request was received. If not, the motion module 146 loops to step 202. Otherwise, the motion module 146 accepts the connection in step 204. In step 208, the motion module 146 determines if commands have been received from the computer 132. If not, control loops to step 202. Otherwise, the motion module 146 determines whether obstacles have been sensed by the sensors in step 212. If obstacles are sensed, the motion module 146 reduces the speed of the controlled device 102 according to the distance to the obstacles in step 214. Control proceeds from steps 212 and 214 to step 218. In step 218, the motion module 146 measures the actual velocity and feedback errors and transmits them to the computer 132. In step 224, control ends. As can be appreciated from the foregoing, the motion module 146 is controlled using event-based control.

Figure 4:
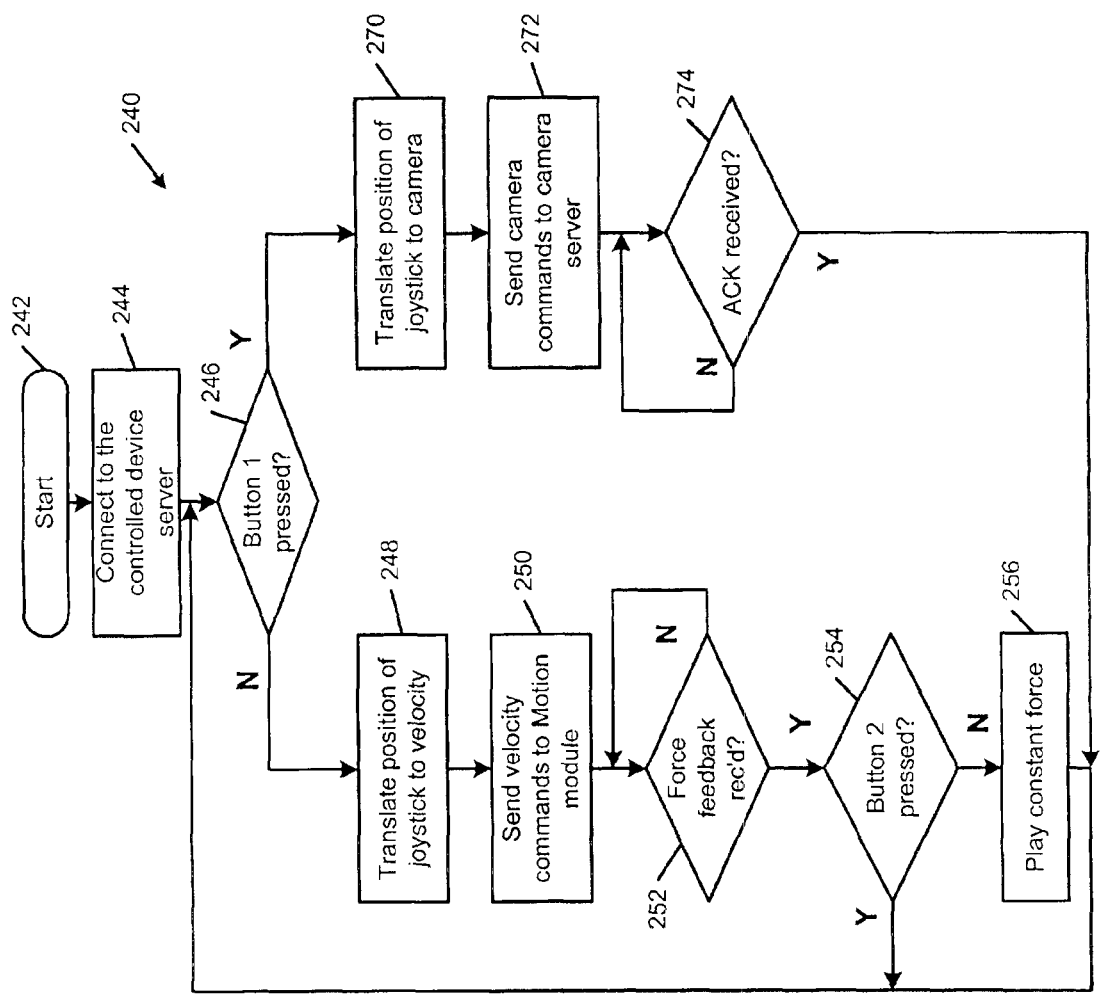
FIG. 4 illustrates steps for controlling a client computer using event-based control.

Referring now to FIG. 4, steps executed by the command module 160 are shown at 240. In step 242, control begins. In step 244, the client is connected to the controlled device 102. In step 246, the command module 160 determines whether a first controller command button is pressed. If not, the command module 160 translates the position of the joystick to velocity in step 248. In step 250, the command module 160 sends the velocity commands to the motion module. In step 252, the command module 160 determines whether force feedback is received. If not, control loops back to step 252. Otherwise, control continues with step 254 where the command module 160 determines whether a second controller command button is pressed. If not, the command module 160 plays a constant force on the feedback device 138 in step 256. Otherwise, control loops back to step 246.

If the first controller command button is pressed as determined in step 246, control continues with step 270. In step 270, the command module 160 translates the position of the joystick to the video sensor. In step 272, video sensor commands are sent to the video module. In step 274, the command module 160 determines whether an acknowledgment has been received. If not, control loops back to step 274. Otherwise, control continues with step 246.

Figure 5:
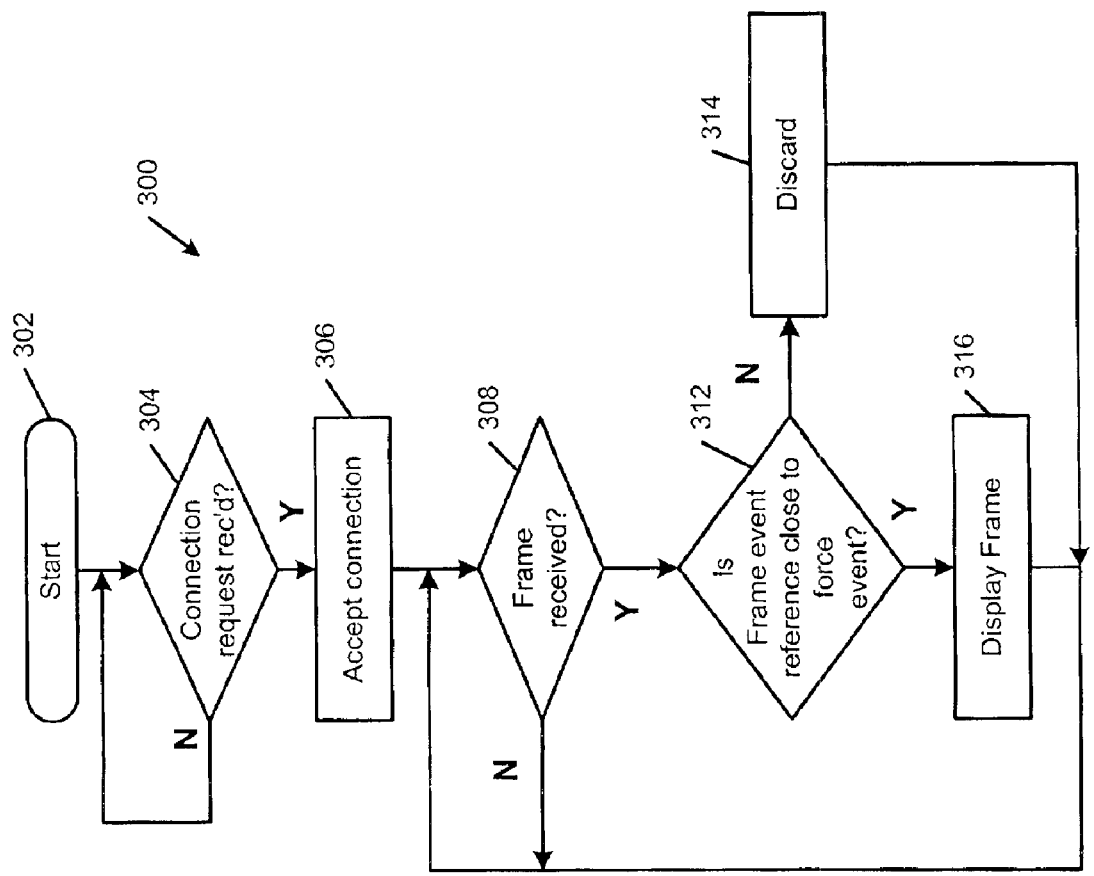
FIG. 5 illustrates steps for controlling a video client using event-based control.

Referring now to FIG. 5, steps for executing a video playback module 300 are illustrated at 300. Control begins with step 302. In step 304, the video playback module 164 determines whether a connection request has been received. If not, control loops back to step 304. Otherwise, control continues with step 306 accepts a connection. In step 308, the video playback module 164 determines whether a video frame has been received. If not, control loops back to step 308. Otherwise, control continues with step 312 where the video playback module determines whether a frame event reference is close to a force event. If not, the video playback module discards the frame in step 314. Otherwise, the video playback module displays the frame in step 316.

Figure 6:
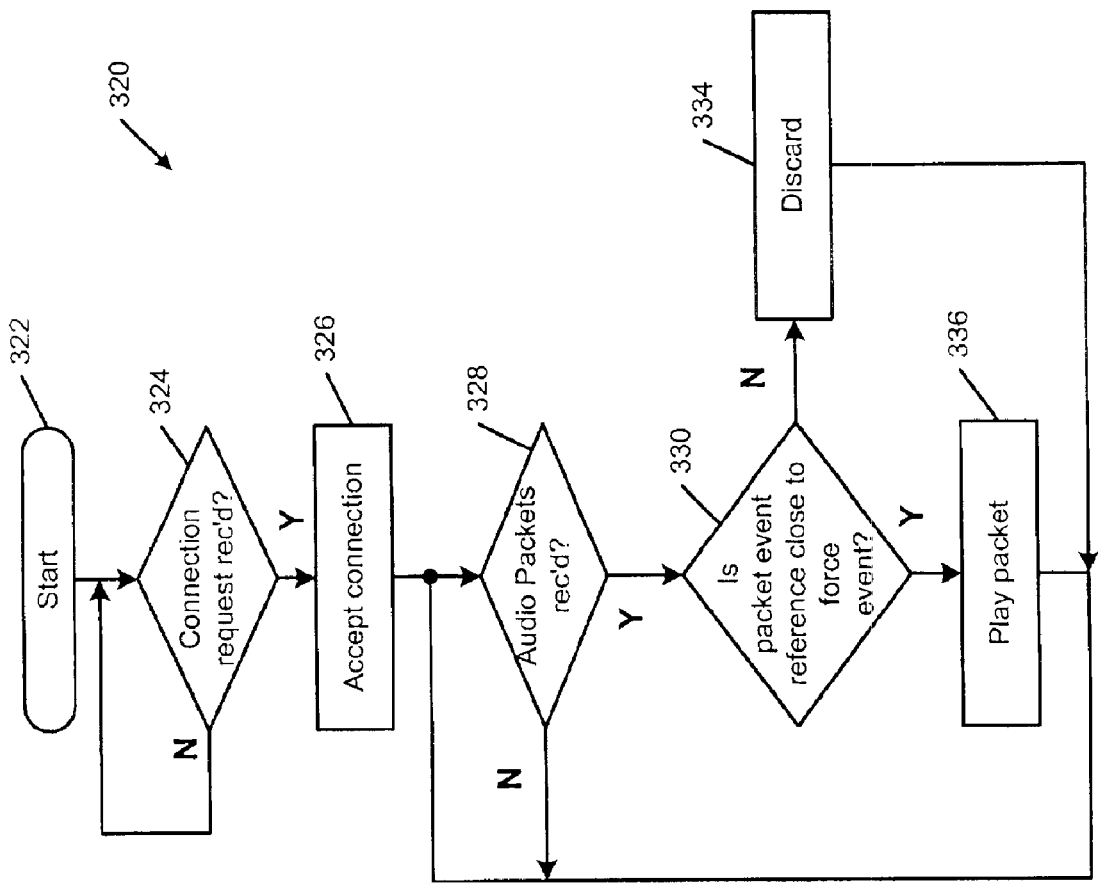
FIG. 6 illustrates steps for controlling an audio client using event-based control.

Referring now to FIG. 6, steps for executing the audio playback module are shown generally at 320. Control begins with step 322. In step 324, the audio playback module 166 determines whether a connection request has been received. In step 326, the audio playback module 166 accepts a connection. In step 328, the audio playback module 166 determines whether audio packets have been received. If not, control loops back to step 328. Otherwise control continues with step 330. In step 330, the audio playback module 166 determines whether the audio packet event reference is close to the force event. If not, the audio playback module 166 discards the audio packets in step 334. Otherwise, the audio playback module 166 plays the audio packet in step 336.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A closed-loop control system that remotely controls a device over the Internet, comprising:
   a device that is connected to said Internet and that generates super-media feedback signals;
   a computer connected to said Internet and a controller that provides super-media feedback, wherein said computer generates and transmits command signals using said controller to said device and outputs said super-media feedback signals to said controller;
   wherein said closed-loop control system is event-based to ensure stability and synchronization of said closed-loop system.

2. The closed-loop control system of claim 1 wherein said computer includes a command module that generates said command signals based on user input to said controller.

3. The closed-loop control system of claim 2 wherein said command module translates said input to said controller to a velocity command signal and transmits said velocity command signal to said device.

4. The closed-loop control system of claim 3 wherein said controller includes a first and second button, wherein said first button enables said controller to send said velocity command signals based on a position of said controller.

5. The closed-loop control system of claim 4 wherein said second button enables said controller to send video control commands based on said input to said controller for controlling a video sensor that is associated with said device.

6. The closed-loop control system of claim 5 wherein when a video frame is received by said computer, said video playback module displays said video frame if said video frame event is close in time to a current super-media feedback event.

7. The closed-loop control system of claim 6 wherein said video playback module discards said video frame if said video frame event is not close in time to said current super-media feedback event.

8. The closed-loop control system of claim 7 wherein a haptic playback module discards a haptic event if said haptic event is not close in event to a reference super-media feedback event.

9. The closed-loop control system of claim 1 wherein said device includes a video sensor that generates video frames and said computer includes a video playback module that controls playback of said video frames that are generated by said device.

10. The closed-loop control system of claim 1 wherein said device includes an audio sensor that generates audio frames and said computer includes an audio playback module that controls playback of said audio frames generated by said audio sensor of said device.

11. The closed-loop control system of claim 10 wherein when said audio frame is received, said audio playback module plays said audio frame if said audio frame event is close in time to a current super-media feedback event.

12. The closed-loop control system of claim 11 wherein a super-media playback module discards a super-media event if said super-media event is not close in time to a reference super-media feedback event.

13. The closed-loop control system of claim 12 wherein said audio playback module discards said audio frame if said audio frame event is not close in time to said current super-media feedback event.

14. The closed-loop control system of claim 1 wherein said device is a robot.

15. The closed-loop control system of claim 1 wherein said device includes a processing unit with a motion module that controls movement of said device.

16. The closed-loop control system of claim 15 wherein said processing unit includes a video module that controls a video sensor.

17. The closed-loop control system of claim 16 wherein said processing unit includes an audio module that controls an audio sensor.

18. The closed-loop control system of claim 17 wherein said device includes at least one distance sensor that generates a distance signal based a distance between said device and at least one obstacle.

19. The closed-loop control system of claim 18 wherein said motion module receives said distance signal, generates a modified command signal using an obstacle avoidance algorithm, and generates said super-media feedback signal based on an actual velocity of said device.

20. A method for remotely controlling a device using a closed-loop control system over the Internet, comprising:
    connecting a device to said distributed communications system;
    generating super-media feedback signals using said device;
    connecting a computer to said distributed communications system that includes a controller that provides super-media feedback;
    generating command signals for said device using said controller and said computer;
    transmitting said commands to said controller;
    receiving said super-media feedback signals from said device; and
    outputting said super-media feedback signals to a user using said controller, wherein said closed-loop control system is event-based to ensure stability and synchronization.

21. The method of claim 20 wherein said computer includes a command module that generates said command signals based on input to said controller.

22. The method of claim 20 further comprising the step of:
    controlling playback of video frames that are generated by a video sensor that is associated with said device.

23. The method of claim 22 further comprising the step of:
    displaying said video frame on said computer when said video frame is received if said video frame event is close in event to said super-media feedback event.

24. The method of claim 20 further comprising the step of:
    controlling playback of audio frames that are generated by an audio sensor that is associated with said device.

25. The method of claim 24 further comprising the step of:
    playing said audio frame on said computer when said audio frame is received if said audio frame event is close in event to said super-media feedback event.

26. The method of claim 20 wherein said device is a robot.

27. The method of claim 20 further comprising the step of:
controlling movement of said device using a motion module that includes an obstacle avoidance algorithm.

28. The method of claim 20 further comprising the step of:
controlling a video sensor that generates video frames using a video module.

29. The method of claim 28 further comprising the step of:
controlling an audio sensor that generates audio frames using an audio module.

30. The method of claim 29 further comprising the step of:
using at least one distance sensor to generate a distance signal based on a distance between said device and at least one obstacle.

31. The method of claim 30 further comprising the steps of:
receiving said distance signal;
generating a modified command signal based on an obstacle avoidance algorithm; and
generating said super-media feedback signal based on an actual velocity of said device.

32. The method of claim 20 further comprising the steps of:
translating a position of said controller to a velocity command signal; and
transmitting said velocity command signal to said motion module.

33. The method of claim 20 wherein said controller includes a first and second button.

34. The method of claim 33 further comprising the steps of:
enabling said controller to send said velocity command signals based input to said controller when said first button is not pressed.

35. The method of claim 34 further comprising the steps of:
enabling said controller to send video control commands based on input to said controller for controlling a video sensor that is associated with said device when said first button is pressed.

* * * * *